(12) United States Patent
Yu et al.

(10) Patent No.: US 7,715,472 B2
(45) Date of Patent: May 11, 2010

(54) EQUALIZER ARCHITECTURE FOR DATA COMMUNICATION

(75) Inventors: Tommy Yu, Orange, CA (US); Amy Gayle Hundhausen, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 768 days.

(21) Appl. No.: 11/583,713

(22) Filed: Oct. 20, 2006

(65) Prior Publication Data

US 2007/0091996 A1   Apr. 26, 2007

Related U.S. Application Data

(60) Provisional application No. 60/729,662, filed on Oct. 25, 2005.

(51) Int. Cl.
*H03H 7/30* (2006.01)
*H03K 5/159* (2006.01)
(52) U.S. Cl. ...................................... 375/232
(58) Field of Classification Search ................. 375/229, 375/230, 231, 232; 708/322, 323
See application file for complete search history.

(56) References Cited

U.S. PATENT DOCUMENTS

| 5,142,552 | A | * | 8/1992 | Tzeng et al. ................. 375/232 |
| 5,283,813 | A | * | 2/1994 | Shalvi et al. ................. 375/230 |
| 5,311,546 | A | * | 5/1994 | Paik et al. .................... 375/232 |
| 6,088,389 | A | * | 7/2000 | Larsson ....................... 375/231 |
| 7,224,725 | B2 | * | 5/2007 | Kim ............................. 375/232 |

OTHER PUBLICATIONS

*Digital Video Broadcasting (DVB): Second generation framing structure, channel coding and modulation systems for Broadcasting, Interactive Services, News Gathering and other broadband satellite applications*, Draft ETSI EN 302 307 V1.1.1, European Standard (Telecommunications series), Entire document: 74 pages, Jun. 2004.

* cited by examiner

*Primary Examiner*—Betsy L Deppe
(74) *Attorney, Agent, or Firm*—Sterne, Kessler, Goldstein & Fox P.L.L.C.

(57) ABSTRACT

An update algorithm for equalizer coefficients in a communications system using phase correction symbols. Instead of using a traditional all symbols slicer update algorithm, the equalizer is updated during phase correction symbols for optimal performance in low signal-to-noise ratio conditions. In lower signal-to-noise ratio conditions, the equalizer uses a phase correction circuit to compensate for distortion caused by a communication channel when a demodulated data stream contains an unknown phase offsets resulting from a fast dynamic distortion. More specifically, the phase correction circuit uses a phase correction signal to correct for the unknown phase offsets in a demodulated data stream in lower signal-to-noise ratio conditions. The equalizer then corrects for distortion caused by the communication channel based upon the phase corrected demodulated data stream.

17 Claims, 8 Drawing Sheets

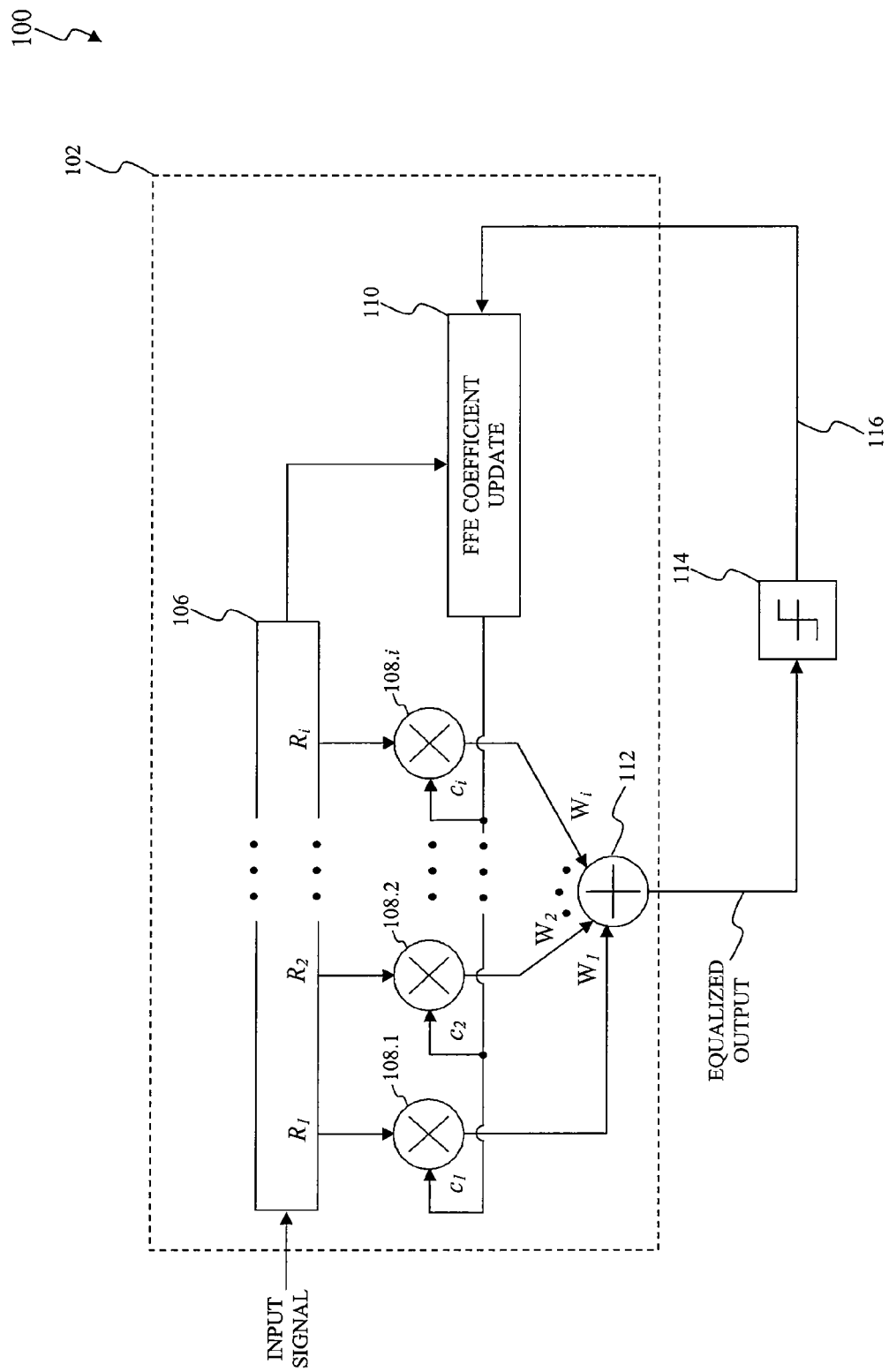
FIG. 1 (CONVENTIONAL)

EQUALIZER ARCHITECTURE FOR DATA COMMUNICATION

CROSS-REFERENCE TO RELATED APPLICATIONS

This application claims the benefit of U.S. Provisional Patent Application No. 60/729,662, filed Oct. 25, 2005, entitled "Equalizer Architecture for Data Communication Using Pilot Symbols," which is incorporated herein by reference in its entirety.

FIELD OF THE INVENTION

The present invention relates generally to equalizers and specifically to updating equalizer coefficients in a communication system.

BACKGROUND

A digital communication system typically involves transmitting a modulated data stream from a transmitter to a receiver over a communication channel. The communication channel can include a microwave radio link, a satellite channel, a fiber optic cable, or a copper cable to provide some examples. A communication channel contains a propagation medium that the modulated data stream passes through before reception by the receiver.

The propagation medium of the communication channel introduces distortion into the transmitted modulated data stream causing a received modulated data stream to differ from the transmitted modulated data stream. Noise, signal strength variations known as fading, phase shift variations, or multiple path delays known as multi-path propagation can introduce distortion into the transmitted modulated data stream. For example, transmission over a multiplicity of paths of different and variable lengths, or rapidly varying delays in the propagation medium from the transmitter to the receiver, may cause a change in the amplitude and/or phase of the transmitted modulated data stream. The distortion caused by the communication channel may be characterized as either static distortion or dynamic distortion. Static distortion occurs when the communication channel does not substantially fluctuate with time. Dynamic distortion occurs when the communication channel fluctuates over time and may be characterized as fast or slow depending on the rate of fluctuation. Different types of distortion tend to fluctuate at different rates. For example, the distortion due to multi-path propagation might be characterized as slow dynamic distortion, whereas the distortion due to phase shift variations might be characterized as fast dynamic distortion.

Digital communication systems use an adjustable filter in the form of an equalizer to reduce the effect of the distortion caused by the communication channel. A receiver may directly set equalization filter coefficients for known or measured communication channels. However, in most situations the characteristics of the communication channel are not known in advance and therefore require the use of an adaptive equalizer. Adaptive equalizers derive adjustable filter coefficients from a received demodulated data stream. The adaptive equalizer may compensate for the distortion caused by the communication channel provided that the distortion is either a static distortion or a slowly fluctuating dynamic distortion. However, the adaptive equalizer is not well suited to compensate for a more rapidly fluctuating distortion, such as distortion due to phase variations.

Conventional equalizer outputs feed their corresponding outputs to a coefficient update module to adjust the equalizer coefficients. If the equalizer output contains fast dynamic distortion components such as phase variations that cannot be compensated by the equalizer, the equalizer coefficients may not be properly updated, and therefore the equalizer may not be able to compensate even slowly fluctuating distortion in the received signal.

To properly update its coefficients in the presence of either fast or slow dynamic phase variations, the adaptive equalizer may operate in conjunction with a phase correction circuit. The imaginary part of one of the equalizer coefficients is constrained to prevent the adaptive equalizer from attempting to correct for the phase variations. The phase correction circuit uses the equalizer output to correct for phase variations then a phase corrected data stream is used to update the equalizer filter coefficients.

Current digital communication systems may operate in lower signal-to-noise ratio conditions. For example, advances in error correction coding allow error free operation for digital communication systems at lower signal-to-noise ratios. This presents a challenge for the conventional phase correction circuits used in current receiver architectures. Conventional phase correction circuits are typically decision based phase locked loops that may not correct the phase of the received demodulated data stream under these lower signal-to-noise ratio conditions.

Therefore, what is needed an adaptive equalizer that is capable of compensating for fast or slow dynamic phase distortion in lower signal-to-noise ratio environments.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

FIG. 1 is an illustration of a block diagram of a conventional equalizer using a Least Mean Squares (LMS) algorithm to update the equalizer coefficients.

Figure 2:
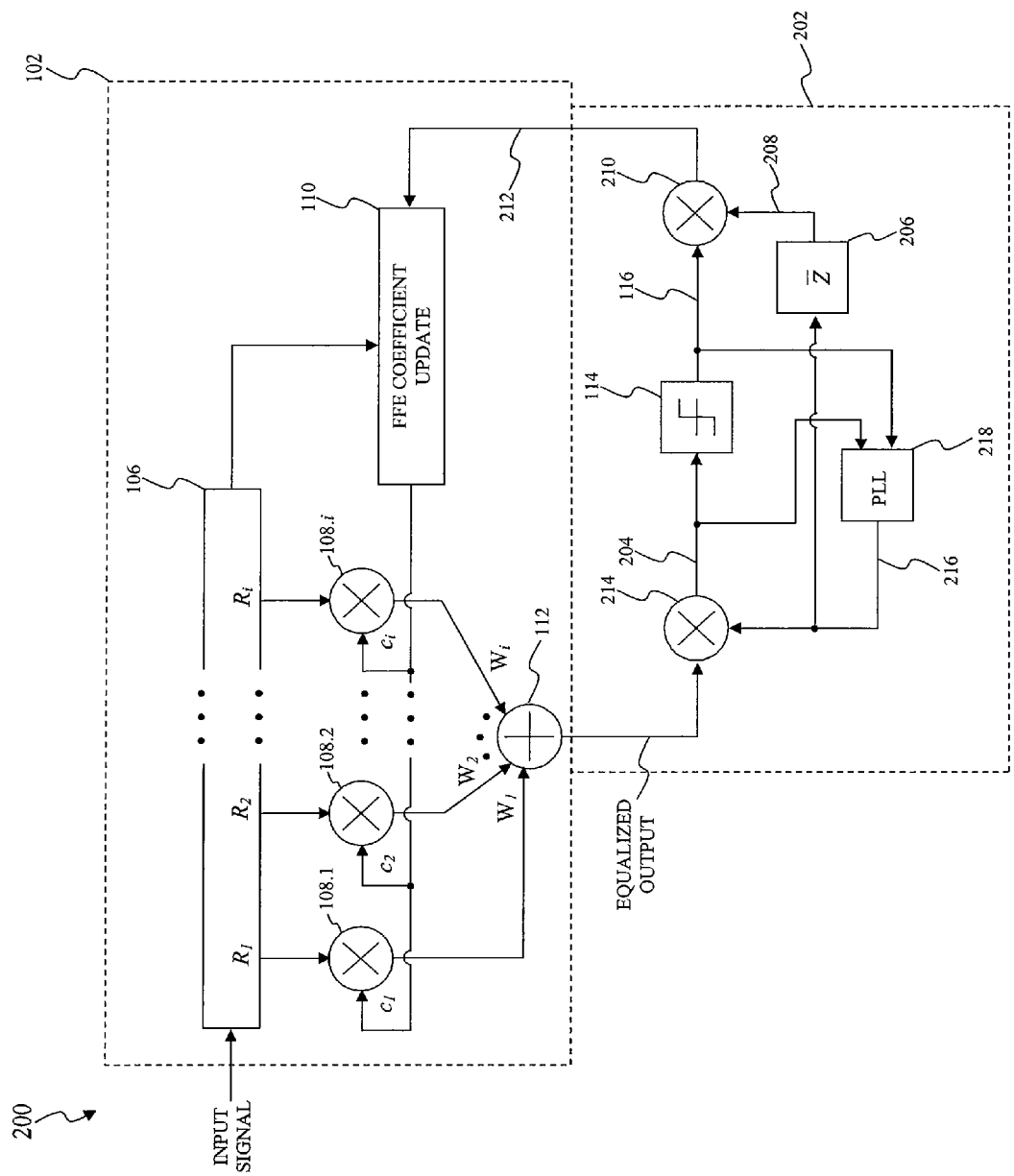
FIG. 2 is an illustration of a block diagram of an equalizer using a phase correcting circuit according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

FIG. 1 is an illustration of a block diagram of a conventional equalizer using a Least Mean Squares (LMS) algorithm to update the equalizer coefficients. As shown in FIG. 1, conventional equalizer 100 operates upon an input signal to produce an equalized output. In an exemplary embodiment, the input signal may be a demodulated data stream from a satellite communication system. During transmission, the propagation medium of the communication channel may introduce distortion into the transmitted modulated data stream causing the input signal of the conventional equalizer 100 to differ from the transmitted modulated data stream. Noise, signal strength variations known as fading, phase shift variations, or multiple path delays known as multi-path propagation may introduce distortion into the transmitted modulated data stream. Conventional equalizer 100 may compensate for the distortion caused by the communication channel provided the input signal does not contain a fast dynamic distortion.

Conventional equalizer 100 generates the equalized output using a feed forward equalizer (FFE) 102. The invention is not limited to the use of a feed forward equalizer. Rather, it will be apparent to persons skilled in the relevant art(s) from the teachings herein that other equalizers, such as a decision feedback equalizer (DFE) to provide an example, are within the scope and spirit of the present invention. Provided the input signal does not contain a fast dynamic distortion, the equalized output contains a reduction in the distortion caused by the communication channel when compared to the input signal.

During operation, the FFE 102 loads the symbol content of the input signal into i registers $R_1$ through $R_i$ of FFE Data Register 106. In an exemplary embodiment, the FFE Data Register 106 is a serial shift register that serially loads the symbol content of the input signal into i registers $R_1$ through $R_i$ of the FFE Data Register 106. A multiplier 108 then multiplies the symbol content of the input signal stored in the registers $R_1$ through $R_i$ of the FFE Data Register 106 by a respective equalizer coefficient c to produce a weighted output W. More specifically, multiplier 108 contains i multipliers 108.1 through 108.i to multiply a corresponding equalizer coefficient $c_1$ through $c_i$ with the corresponding symbol content of the input signal stored in the registers $R_1$ through $R_i$ to produce a corresponding weighted output $W_1$ through $W_i$. For example, the multiplier 108.1 multiplies the equalizer coefficient $c_1$ with the symbol content of the input signal stored in the register $R_1$ to produce weighted the output $W_1$. The FFE 102 then forms the equalized output by combining the weighted outputs $W_1$ through $W_i$ using a summer 112. Provided the input signal does not contain a fast dynamic distortion, the distortion embedded in the equalized output distortion is reduced in comparison to the input signal.

After generating the equalized output, FFE 102 updates the equalizer coefficient c using the FFE coefficient update module 110 according to the Least Mean Squares (LMS) algorithm. The LMS algorithm is well known in the art. The updated, or next, set of equalizer coefficients $c_1$ through $c_i$ may be expressed as:

$$\vec{C}_{k+1} = \vec{C}_k + \Delta \times \epsilon_k \times \vec{R}^*_k, \quad (1)$$

where k represents the point in time where equalizer coefficients $c_1$ through $c_i$ are updated, $\vec{C}_{k+1}$ represents the next set of equalizer coefficients $c_1$ through $c_i$, $\vec{C}_k$ represents the current set of equalizer coefficients $c_1$ through $c_i$, $\Delta$ represents the equalizer step size, $\epsilon_k$ represents the slicer error for the current value of the equalized output, and $\vec{R}^*_k$ represents the conjugate of the FFE Data Register vector. The equalizer step size, $\Delta$, relates to the speed at which the equalizer coefficients $c_1$ through $c_i$ update. In an exemplary embodiment, conventional equalizer 100 may program $\Delta$ into the coefficient update module 110. The LMS algorithm adapts the coefficients to minimize the error term $\epsilon_k$ in the mean squared sense.

A dynamic distortion is a type of distortion caused by the communication channel that may fluctuate over time and may be characterized as fast or slow depending on the rate of fluctuation. The ability of equalizer 100 to compensate for dynamic distortion is limited by a maximum value of the equalizer step size $\Delta$. As used herein, a slow dynamic distortion is a distortion caused by the communication channel that equalizer 100 may compensate for by using the maximum value for the equalizer step size $\Delta$. Otherwise, a fast dynamic distortion, as used herein, is a distortion caused by the communication channel that equalizer 100 may not compensate using the maximum value for the equalizer step size $\Delta$.

The slicer error $\epsilon_k$, denoted as 116 in FIG. 1, is the error of the equalized output relative to a chosen decision point. More specifically, a slicer 114 compares the equalized output with a corresponding threshold level and chooses its best estimate of the transmitted signal. The estimate is also known as the slicer decision. The slicer error $\epsilon_k$ is defined as the difference between the slicer decision and the slicer input at time k. The FFE Data Register vector $\vec{R}^*_k$ may be defined as the conjugate of the content of the input signal in registers $R_1$ through $R_i$ at time k. FFE Data Register vector $\vec{R}^*_k$ relates to the content of the input signal in the registers $R_1$ through $R_i$ at substantially the same point in time when the slicer 114 decides the slicer error $\epsilon_k$. In an exemplary embodiment, the FFE coefficient update module 110 generates $\vec{R}^*_k$ using the content of the input signal stored in the registers $R_1$ through $R_i$ of the FFE Data Register 106.

Conventional equalizer 100 may compensate for the distortion caused by the communication channel provided the input signal does not contain a fast dynamic distortion such as fast phase variation to provide an example. When the input signal contains a dynamic distortion, the equalizer step size $\Delta$ for equalizer 100 must be set sufficiently large to compensate for it. If the dynamic distortion is not compensated, the slicer error term $\epsilon_k$ cannot be effectively minimized, and the equalizer coefficients $c_1$ through $c_i$ may not converge. However, a large equalizer step size $\Delta$ may cause a large mean squared error at the equalizer output that increases the system bit error rate. A large equalizer step size $\Delta$ may even cause divergence of the equalizer coefficients $c_1$ through $c_i$. The maximum equalizer step size $\Delta$ that ensures convergence depends on the correlation statistics of the input signal.

A phase correction circuit is best suited to correct for phase variations. Phase variations may be characterized as either a fast dynamic distortion or a slow dynamic distortion. A phase correction circuit can compensate for the phase variations whether the distortion is slow or fast. The adaptive equalizer may be used in conjunction with the phase correcting circuit so that the phase variations can be removed prior to generation of the slicer error term $\epsilon_k$.

FIG. 2 is an illustration of a block diagram of an equalizer 200 using a phase correcting circuit according to an embodiment of the present invention. In high signal-to-noise ratio conditions, the equalizer 200 includes a phase alignment module with an incorporated phase locked loop (PLL) that compensates for phase variations, thereby allowing the equalizer 200 to compensate for slow dynamic distortion caused by a communication channel. However, in lower signal-to-noise ratio conditions, the phase alignment module with the incorporated PLL cannot reliably compensate for the phase variations, and therefore the equalizer 200 filter coefficients $c_l$ through $c_i$ cannot be properly adjusted to allow the equalizer 200 to correct for other types of distortion in the received signal.

The equalizer 200 includes a FFE 102 and a phase alignment module 202. The FFE 102 operates in a substantially similar manner as previously demonstrated in FIG. 1. In high signal-to-noise ratio conditions, the phase alignment module 202 corrects for unknown phase offsets in the received signal. The phase offset between the slicer error $\epsilon_k$, denoted as the slicer error 116, and the content of the input signal in registers $R_l$ through $R_i$ causes the equalizer 200 coefficient update defined in Equation 1 to not function properly. Therefore, after the phase alignment module 202 corrects for the unknown phase offsets in the received signal, it aligns the phase of the slicer error $\epsilon_k$ with the phase of the content of the input signal in the registers $R_l$ through $R_i$. As a result, the equalization coefficients $c_l$ through $c_i$ may be properly updated thereby allowing equalizer 200 to compensate for the slow dynamic distortion caused by the communication channel in high signal-to-noise ratio conditions. However, in lower signal-to-noise ratio conditions, the phase alignment module with the incorporated phase locked loop (PLL) cannot reliably correct for the unknown phase offsets in the received signal, and therefore the equalization filter coefficients $c_l$ through $c_i$ cannot be properly adjusted. As a result, the equalizer 200 cannot reliably compensate for the slow dynamic distortion caused by the communication channel in lower signal-to-noise ratio conditions.

The input signal may be a demodulated data stream with unknown phase offsets caused by the communication channel. An unknown phase offset in the received satellite communication signal offsets the phase of the input signal from the phase of the transmitted modulated data stream. For example, the propagation medium in the communication channel or the movement of the satellite can cause the unknown phase offsets. The unknown phase offsets may also be referred to as phase variation. In an exemplary embodiment, the equalizer 200 receives the input signal from a satellite channel at a data rate of 20 Megasymbols per second (Msps). The symbol content of the equalized output contains substantially similar unknown phase offsets when compared to the symbol content of the input signal.

The phase alignment module 202 rather than the FFE 102 may compensate for the unknown phase offsets in the symbol content of the input signal. The phase alignment module 202 includes a slicer 114, a conjugate module 206, a multiplier 210, a multiplier 214, and a phase locked loop (PLL) 218. As shown in FIG. 2, the phase alignment module 202 operates upon the equalized output to produce a phase corrected signal 212.

A multiplier 214 multiplies the symbol content of the equalized output with a phase estimate 216 to produce a derotated output 204. In an exemplary embodiment, the derotated output may be used as an input to other systems within the receiver. The unknown phase offsets present in the equalized output may rotate constellation points in its constellation diagram. A constellation diagram is a representation of a digital modulation scheme in the complex plane. For example, the unknown phase offsets in the equalized output for a 16-quadrature amplitude modulation (QAM) communication signal may rotate the sixteen constellation points an amount related to the unknown phase offsets. The multiplier 214 multiplies the symbol content of the equalized output by the phase estimate 216 to rotate the constellation points in the constellation diagram in the opposite direction as the unknown phase offsets.

The phase estimate 216 is an estimation of the unknown phase offset present in the symbol content of the equalized output. The PLL 218 generates the phase estimate 216 based upon a slicer error 116. More specifically, the slicer 114 compares the derotated output 204 with a corresponding threshold level and chooses its best estimate of the transmitted signal, referred to as a slicer decision. The slicer error 116 may be defined as the difference between the slicer decision and the slicer input. The PLL 218 uses the slicer error 116 and the derotated output 204 to create the phase estimate 216. The PLL 218 operates reliably under high signal-to-noise ratio conditions. A high signal-to-noise condition occurs when the magnitude of the equalized output is substantially larger than the magnitude of any associated noise. In this situation, the decisions of slicer 114 are relatively accurate, so the phase estimate 216 is relatively accurate. However, in lower signal-to-noise conditions, the difference between the magnitude of the equalized output and the magnitude of the associated noise substantially lessens. In these lower signal-to-noise ratio conditions, the decisions of slicer 114 are relatively inaccurate, so the slicer error 116 is relatively inaccurate. As a result, the phase estimate 216 may become corrupted, and the unknown phase offsets in the equalized output may not be compensated for. Therefore, the filter coefficients $c_l$ through $c_i$ may not be properly adjusted. As a result, the equalizer 200 may not be able to correct for slow dynamic distortion in the received signal.

The slicer error 116 is substantially relative to the slicer error $\epsilon_k$ as presented in equation 1. The phase alignment module 202 aligns the phase of slicer error 116 with the phase of the content of the input signal in registers $R_l$ through $R_i$ to allow for the proper updating of the equalizer 200 coefficients c according to the LMS algorithm. A conjugate module 206 operates upon the phase estimate 216 to produce a complex conjugate of the phase estimate; denoted as a conjugated phase estimate 208. A multiplier 210 multiplies the slicer error 116 and the conjugated phase estimate 208 to produce the phase corrected error signal 212. In other words, the multiplier 210 generates the phase corrected signal 212 by rotating the slicer error 116 by the complex conjugate of the phase estimate 216, denoted as the conjugated phase estimate 208. In high signal-to-noise ratio conditions, the phase corrected signal 212 is the slicer error $\epsilon_k$ after it has been aligned with the phase of the content of the input signal in the registers $R_l$ through $R_i$. The phase alignment allows for the proper updating of the equalizer 200 coefficients $c_l$ through $c_i$ according to the LMS algorithm. As previously mentioned, the slicer 114 and PLL 218 are unreliable for lower signal-to-noise ratio conditions.

Figure 3:
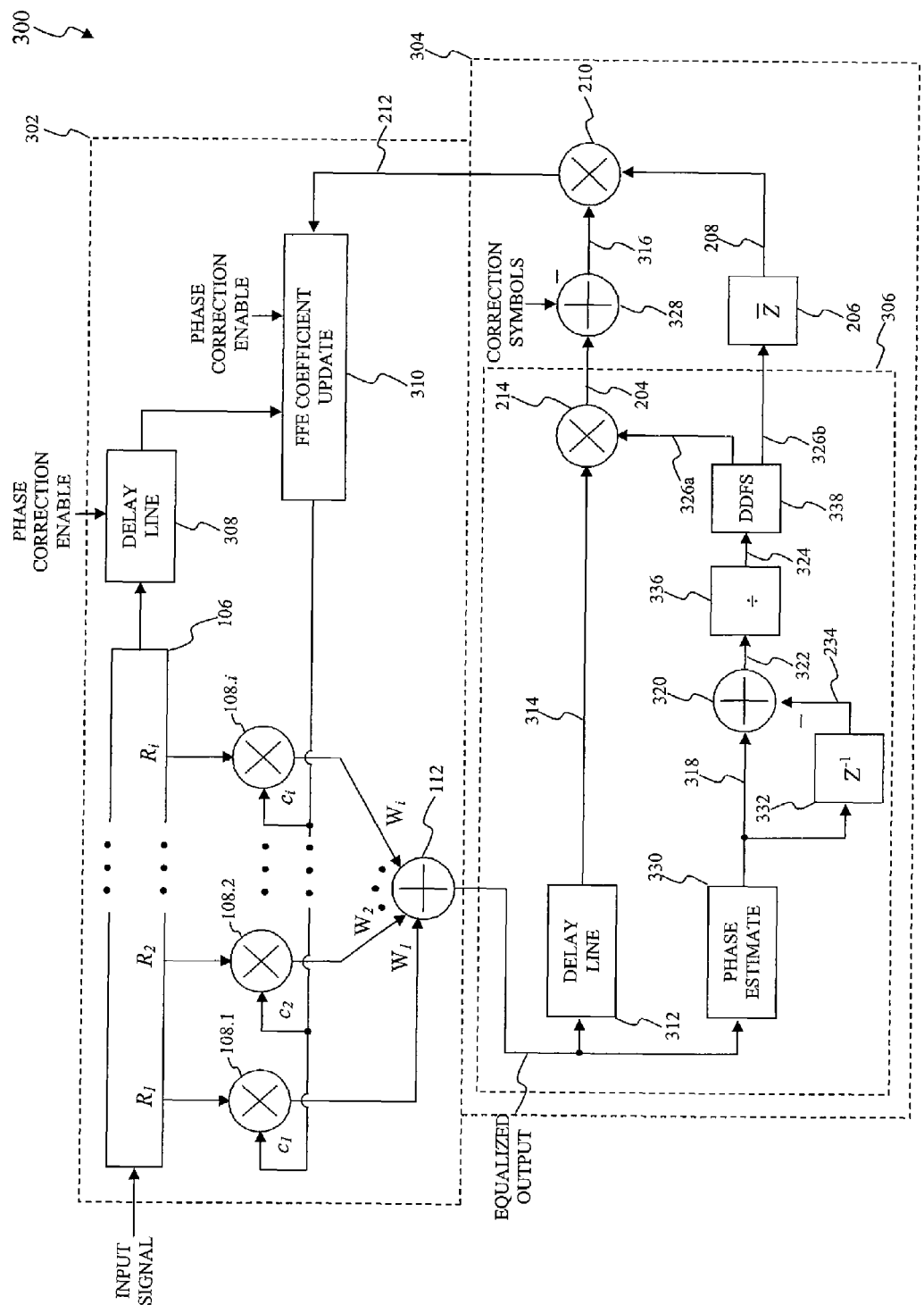
FIG. 3 is an illustration of a block diagram of an equalizer using a phase correcting circuit according to another exemplary embodiment of the present invention

FIG. 3 is an illustration of a block diagram of an equalizer using a phase correcting circuit according to an embodiment of the present invention. In both high signal-to-noise ratio and lower signal-to-noise ratio conditions, an equalizer 300 may compensate for phase variation distortion caused by a communication channel. More specifically, the equalizer 300 uses a phase correcting circuit that is capable of compensating for either slow or fast changing unknown phase offsets in both high signal-to-noise ratio and lower signal-to-noise ratio conditions. The process of phase offset compensation introduces phase offsets between the slicer error $\epsilon_k$, which is denoted as slicer error 316, and the phase of the content of the input signal in registers $R_l$ through Ri. The equalizer 300 realigns the phase of the slicer error $\epsilon_k$ with the phase of the content of the input signal in registers $R_l$ through $R_i$ prior to calculating $\vec{R}_k$.

Figure 4:
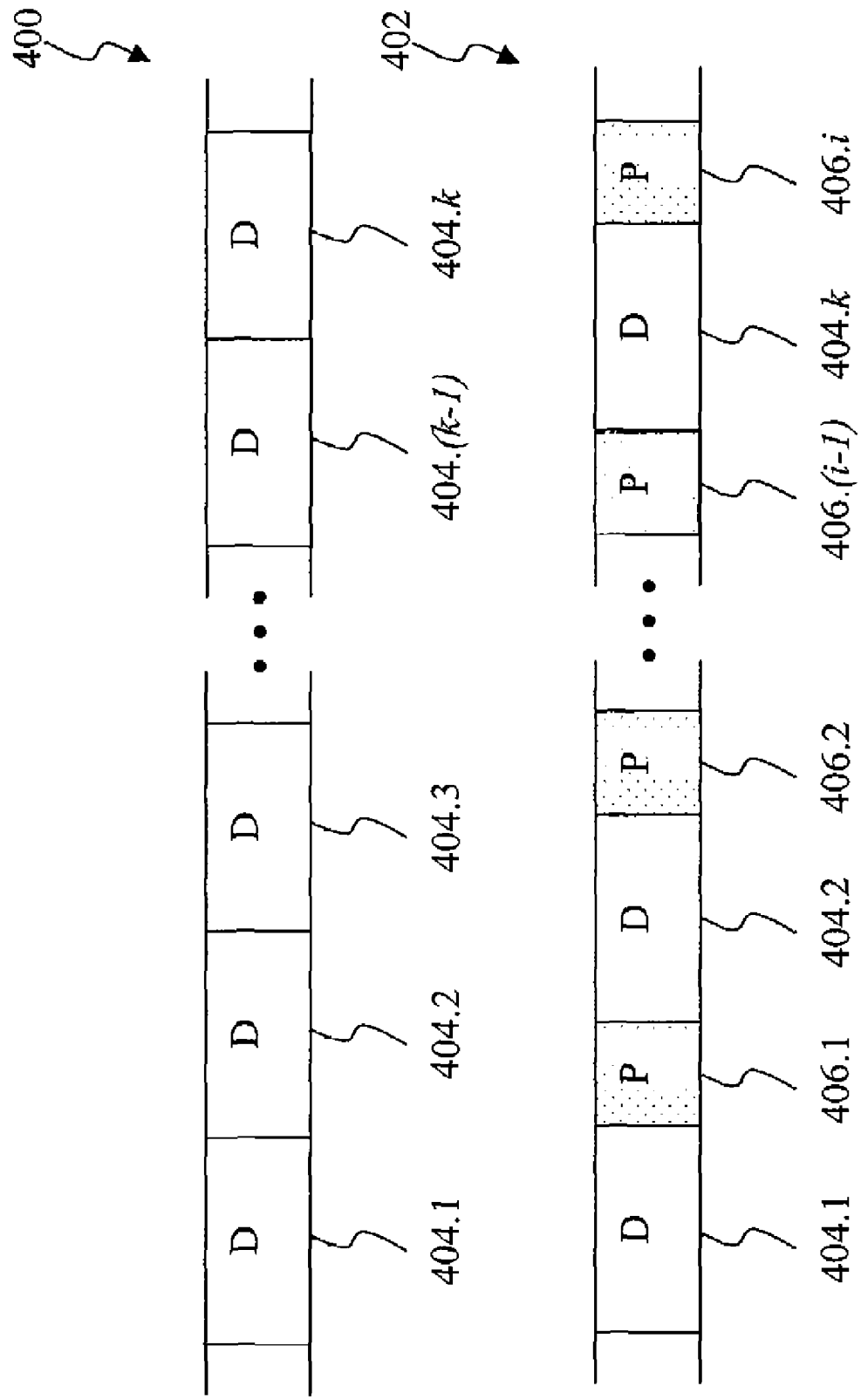
FIG. 4 is an illustration of a transmitted modulated data stream according to an embodiment of the present invention.

In an exemplary embodiment, the equalizer 300 uses a subset of the input symbols to correct for the unknown phase offsets in lower signal-to-noise ratio conditions. A digital communication system typically involves transmitting a modulated data stream from a transmitter to a receiver over a communication channel. FIG. 4 is an illustration of a transmitted modulated data stream according to an embodiment of the present invention. The transmitted modulated data stream, denoted as a data stream 400, comprises k groups of data stream symbols 404.1 through 404.k. In an exemplary embodiment, each individual group of data stream symbols in 404 is 1440 symbols in duration. Those skilled in the arts will recognize that the groups of data stream symbols 404.1 through 404.k may be differing lengths.

The receiver may use the transmitted modulated data stream, denoted as a data stream 402, to compensate for unknown phase offsets in both high signal-to-noise ratio and lower signal-to-noise ratio conditions. In an exemplary embodiment, the equalizer 300 uses a subset of the input signal stream to compensate for unknown phase offsets in lower signal-to-noise ratio conditions The unknown phase offset compensation allows equalizer 300 to properly calculate the filter coefficients $c_l$ through $c_i$. Phase correction symbol 406 contains i groups of symbols 406.1 through 406.i embedded periodically in the data stream 400. For example, the phase correction symbol group 406.1 as shown in located between data stream symbol groups 404.1 and 404.2. In an exemplary embodiment, the phase correction symbols embedded in 406 may contain a binary phase shift keyed (BPSK), a quadrature phase shift keyed (QPSK) modulated data stream, or any other suitable modulation format so long as they allow for reliable phase estimation.

In another exemplary embodiment, the transmitter may embed phase correction symbol 406 with known pilot symbols. In an exemplary embodiment, each group of pilot symbols is 36 symbols in duration. The pilot symbols allow equalizer 300 to compensate for unknown phase offsets in both high signal-to-noise ratio and lower signal-to-noise ratio conditions. The unknown phase offset compensation allows equalizer 300 to properly calculate the filter coefficients $c_l$ through $c_i$. Those skilled in the art will recognize that the pilot symbol groups may be of any length, so long as they are of sufficient duration long to allow for reliable phase estimation.

Referring back to FIG. 3, the equalizer 300 includes a FFE 302 and a phase alignment module 304. The phase correction symbols embedded in the input signal require supplemental hardware for the FFE 302; otherwise, the FFE 302 operates in a substantially similar manner as the FFE 102 as previously demonstrated in FIG. 1. More specifically, the FFE 302 includes a delay line 308 and a modified FFE coefficient update module 310.

According to the LMS algorithm, as shown in equation 1, the proper update of equalizer filter coefficients $c_l$ through $c_i$ requires the phase and time alignment of the slicer error $\epsilon_k$ with the input signal in registers $R_l$ through $R_i$ The phase alignment module 304 estimates the unknown phase offsets present in the symbol content of the phase correction symbol 406 as shown in FIG. 4. The phase alignment module uses the estimates derived from the phase correction symbol 406 to correct for the unknown phase offsets in data stream 402. The phase alignment module 304 may buffer or delay the equalizer output until the phase correction module 306 estimates the unknown phase offsets present in the symbol content of multiple groups of phase correction symbols 406. As a result of the delay imposed on the equalized output and by extension the slicer error signal $\epsilon_k$, the input symbol vector $\vec{R}^*_k$ must incur a matching delay to properly update the equalizer coefficients $c_l$ through $c_i$ using the LMS algorithm. In an exemplary embodiment, delay line 308 delays the conjugate of the FFE Data Register vector $\vec{R}^*_k$ an amount substantially equal to the amount of delay present in the phase alignment module 304. The amount of delay present in the phase alignment module determines the size of delay line 308.

In an exemplary embodiment, the equalizer coefficients $c_l$ through $c_i$ may be updated every symbol. In another exemplary embodiment, the equalizer coefficients $c_l$ through $c_i$ are updated using only the portion of the equalized output corresponding to phase correction symbols. For this exemplary embodiment, delay line 308 may be implemented using a memory, such a random access memory to provide an example, to store those FFE input symbols that are present in the FFE Data Register 106 when the equalized output contains phase correction symbols. The number of elements in the memory is equivalent to the sum of the number of phase correction symbols in a group of phase correction symbols and the number of multipliers 108 in the FFE 302 minus one. The size of the memory may be substantially smaller than the delay line that would be required if the equalizer coefficients were updated every symbol. In this exemplary embodiment, the memory includes a phase correction enable signal that transfers a set of stored symbols to the modified FFE coefficient update module 310 at the instant in time when the slicer error $\epsilon_k$ corresponds to a phase correction symbol. Similarly, the modified FFE coefficient update module 310 may include a phase correction enable signal that allows the update of the equalizer coefficients $c_l$ through $c_i$ to occur when the slicer error $\epsilon_k$ corresponds to a pilot symbol.

In high signal-to-noise ratio and lower signal-to-noise ratio conditions, the phase alignment module 304 aligns the phase of slicer error $\epsilon_k$ with the phase of the content of the input signal in registers $R_l$ through $R_i$. The phase alignment module 304 includes a phase correction module 306, a summer 328, a conjugate module 206, and a multiplier 210. The phase correction module is the mechanism by which the equalizer 300 substantially corrects for the unknown phase offsets in the symbol content of the equalized output. The phase correction module 306 includes a delay line 312, a multiplier 214, a phase estimate module 330, a delay module 332, a summer 320, a scalar 336, and a Direct Digital Frequency Synthesizer (DDFS) 338.

The equalized output is embedded with phase correction symbols as shown in FIG. 4. The symbol content of the equalized output contains substantially similar unknown phase offsets when compared to the symbol content of the input signal.

The delay line 312 produces a delayed equalized output 314 by delaying the symbol content of the equalized output until the phase alignment module 304 estimates the unknown phase offsets present in the symbol content of adjacent groups of phase correction symbols. In an exemplary embodiment, the delay line 312 delays the symbol content of the equalized output by the number of symbols located between adjacent groups of phase correction symbols. For example, if the data located between adjacent groups of phase correction symbols is 1440 symbols in length, and the phase correction symbol groups are 36 symbols in length, then the delay line 312 may delay the equalized output by 1476 symbols.

The phase estimate block 330 generates an estimate of the unknown phase offset present in the equalizer output based on a group of phase correction symbols. The phase correction module 306 may use one or more phase estimates to correct the symbol content of the equalized output for the unknown phase offsets. A delay module 332 delays the phase estimate 318 to produce a delayed phase estimate 334. More specifically, the delay module 332 delays the phase estimate 318 until the phase correction module 306 locates an adjacent group of phase correction symbols. After locating the adjacent group of phase correction symbols, the delayed phase estimate 334 and the current phase estimate 318 may be combined to correct the symbol content of the equalized output for the unknown phase offsets. To determine whether the symbol content of the equalized output is a phase correction symbol, the equalizer 300 may use a header acquisition system, a frame synchronization process, or any other suitable means.

Summer 320 generates an offset estimation 322 using the difference between the current phase estimate 318 and the delayed phase estimate 334. For example, as previously shown in FIG. 4, if the phase correction symbol group denoted as 406.1, contains a phase offset of 10.0 degrees, the phase estimate module 330 may generate a phase estimate 318 corresponding to 10.0 degrees. Upon location of the adjacent phase correction symbol group, in this case denoted 406.2, the delay module 332 generates the delayed phase estimate 334. Delayed phase estimate 334 is a delayed version of the phase estimate 318. If the phase correction symbol group 406.2 contains an offset of 15.0 degrees, phase estimate module 330 may generate a phase estimate 318 that corresponds to 15.0 degrees. Summer 320 then generates an offset estimation 322 corresponding to 5.0 degrees by subtracting the phase estimate 318 from the delayed phase estimate 334.

A scalar 336 scales the offset estimate 322 to produce a scaled estimation 324. More specifically, the scalar 336 divides the offset estimate 322 by an amount equal to the number of symbols located between the adjacent groups of phase correction symbols. For example, the scalar 336 may divide the offset estimate 322 by 1476. A DDFS 338 integrates the scaled estimation 324 over time to produce a linear phase ramp. It then converts the phase ramp into a sinusoidal complex representation, where the phase of each component sinusoidal output is a linear ramp over time. In an exemplary embodiment, a DDFS output 326a and a DDFS output 326b are substantially equivalent. The phase correction module 306 uses the DDFS output 326 to compensate for the unknown phase offsets present in the equalized output.

The phase ramp that underlies the DDFS output 326 is a substantially linear function whose slope is dependent on the phase difference between adjacent groups of phase correction symbols. If the difference between the phase of the adjacent groups of phase correction symbols is negative, for example, the phase correction symbol group 406.1 has a substantially greater unknown phase offset than the phase correction symbol group 406.2 as shown in FIG. 4, then the phase ramp that underlies the DDFS output 326 is a substantially decreasing linear function. In this case, the phase ramp that underlies the DDFS output 326 will have a maximum value when evaluating the symbol content adjacent to the phase correction symbol group 406.1. The phase ramp that underlies the DDFS output 326 will have a minimum value when evaluating the symbol content adjacent to phase correction symbol group 406.2. On the other hand, if the difference between the phases of the adjacent phase correction symbol groups is positive, for example, when the phase correction symbol group 406.1 has a substantially lesser unknown phase offset than the phase correction symbol group 406.2 as shown in FIG. 4, the phase ramp that underlies the DDFS output 326 is a substantially increasing linear function. In this case, phase ramp that underlies the DDFS output 326 will have a minimum value when evaluating the symbol content adjacent to 406.1. The phase ramp that underlies the DDFS output 326 will have a maximum value when evaluating the symbol content adjacent to 406.2.

Multiplier 214 multiplies each individual symbol of the delay line output 314, which is embedded with substantially similar symbols as the equalized output, with a corresponding value from the DDFS output 326a to produce a derotated output 204. The unknown phase offset may rotate constellation points in the constellation diagram of the equalized output. A constellation diagram is a representation of a digital modulation scheme in the complex plane. For example, the unknown phase offset in the equalized output for a 16-quadrature amplitude modulation (QAM) communication signal may rotate the sixteen constellation points an amount related to the unknown phase offset. Multiplier 214 multiplies the symbol content of the delayed equalizer output by a corresponding value from the DDFS output 326a to rotate the constellation points in the constellation diagram in the opposite direction as the unknown phase offset.

A slicer error 316 is substantially relative to the slicer error $\epsilon_k$ as presented in equation 1. In an exemplary embodiment, the equalizer coefficients are updated when the slicer error $\epsilon_k$ corresponds to a phase correction symbol. A summer 328 forms the slicer error 316 by subtracting the known phase correction symbols from the derotated output 204 when the derotated output 204 corresponds to a phase correction symbol. Equalizer 300 may regenerate the phase correction symbols using any suitable means.

The phase alignment module 304 aligns the phase of the slicer error 316 with the content of the input signal in registers $R_l$ through $R_i$ to allow for the proper updating of the equalizer coefficients $c_l$ through $c_i$ according to the LMS algorithm. Conjugate module 206 conjugates the DDFS output 326b to produce a conjugated phase estimate 208 whose elements are complex conjugates of the elements in DDFS output 326b. Multiplier 210 multiplies the slicer error 316 and the conjugated phase estimate 208 to produce the phase corrected signal 212. In other words, multiplier 210 generates the phase corrected signal 212 by rotating the slicer error 316 by the complex conjugate of the signal used to rotate the delayed equalized output 314. The signal 212 is a slicer error $\epsilon_k$ that is time and phase aligned with the content of the input signal in delay line 308 allowing equalizer 300 to properly update the equalizer coefficients $c_l$ through $c_i$ according to the LMS algorithm.

Figure 5:
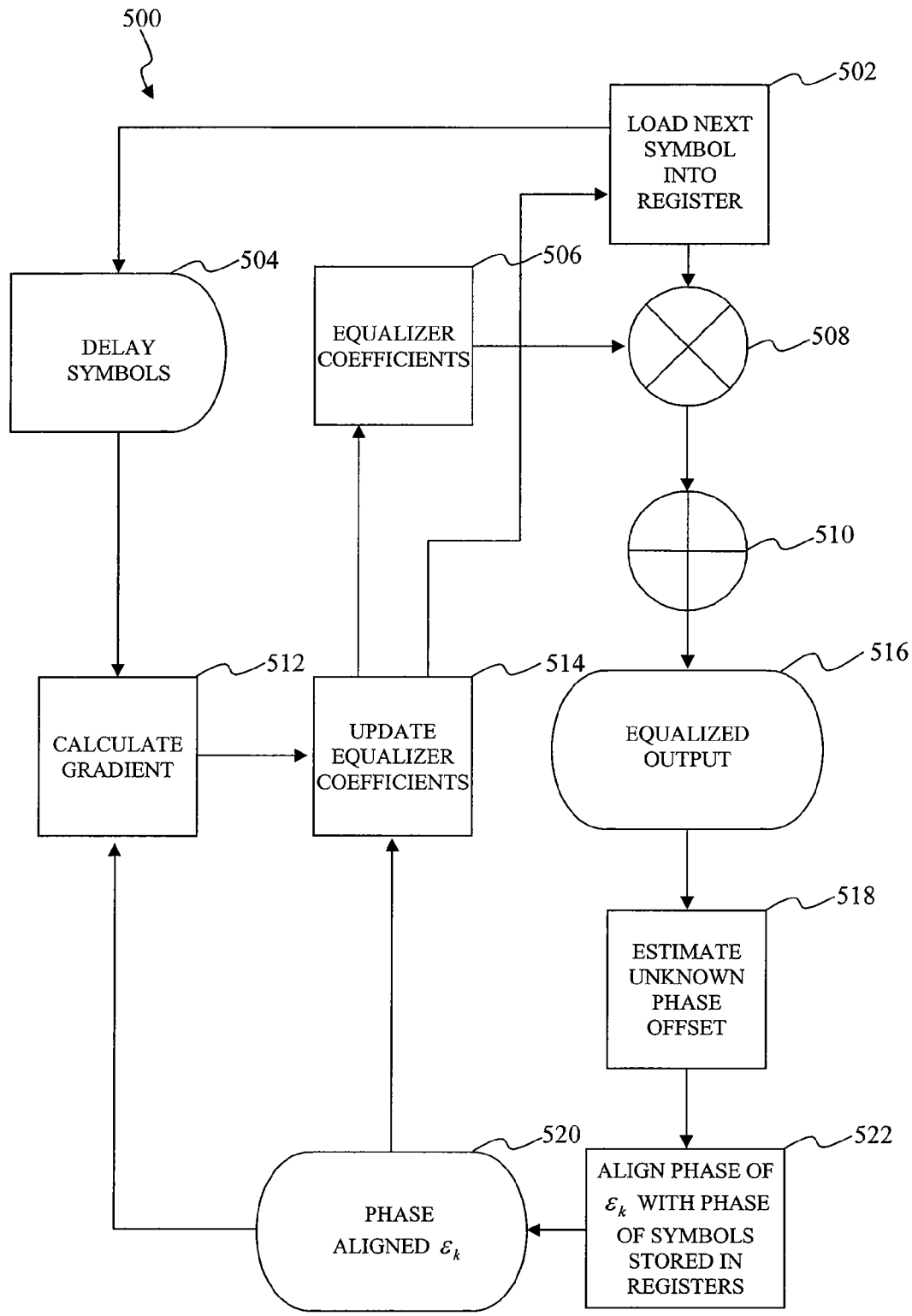
FIG. 5 is a flowchart of exemplary operational steps of an equalizer according to a first aspect of the present invention.

FIG. 5 is a flowchart of exemplary operational steps of an equalizer according to a first aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 5.

At step 502, the equalizer loads a symbol from the symbol content of the input signal into a serial shift register. The input signal may be a demodulated data stream with unknown phase offsets resulting from slow or fast dynamic distortion. An unknown phase offset in the received satellite communication signal offsets the phase of the input signal from the phase of the transmitted modulated data stream. For example, the propagation medium in the communication channel or the movement of the satellite can cause the unknown phase offset. The transmitter may embed phase correction symbols into the input signal to allow a phase correction circuit to correct for the unknown phase offsets in lower signal-to-noise ratio and high signal-to-noise ratio conditions.

At step 504, the equalizer delays the symbols stored in the serial shift register by an amount substantially equal to the delay through the phase alignment module 304. The phase alignment module compensates for the unknown phase offsets in the received symbol stream. The equalizer delays the symbols stored in the serial shift register to time align the slicer error $\epsilon_k$ with the symbols stored in the serial shift register. In an exemplary embodiment, the equalizer time aligns only those symbols that correspond to a phase correction symbol at the equalizer output.

At step 508, the equalizer multiplies each symbol stored in the serial shift register by a corresponding equalizer coefficient. More specifically, the equalizer weights each symbol stored in the serial shift register during step 502 by multiplying each symbol with a corresponding equalizer coefficient from step 506.

At step 510, the equalizer then combines all of the weighted symbols to form an equalized output. In other words, the equalizer combines the weighted symbols generated in step 508 into a single symbol denoted as the equalized output represented by step 516. The symbol content of the equalized output contains a reduction in the distortion caused by the communication channel when compared to the symbol content of the input signal.

At step 516, the equalizer presents the equalized output to a phase correction module, represented by step 518, to initiate the process of compensating unknown phase offsets resulting from the fast or slow dynamic distortion embedded in the received symbol stream.

At step 518, a phase correction module generates estimates of the unknown phase offsets present in adjacent groups of phase correction symbols. The phase correction module then uses the difference between the phase estimates for adjacent groups of phase correction symbols to generate a phase ramp that is used to correct for the unknown phase offset. Step 518 is explained in further detail below in FIG. 6.

At step 522, the equalizer produces a phase aligned slicer error $\epsilon_k$ represented by step 520. More specifically, the equalizer first generates the slicer error $\epsilon_k$ then aligns the phase of the slicer error $\epsilon_k$ with the phase of the symbols stored in the serial shift register. Step 522 is explained in further detail below in FIG. 7.

At step 512, an equalizer coefficient update block calculates the gradient, which is the product of the slicer error $\epsilon_k$ and the complex conjugate of the FFE Data Register vector $\vec{R}^*_k$. More specifically, the equalizer calculates the product of the complex conjugate of the delayed version of the symbols stored in the serial shift register from step 504 and the phase aligned slicer error $\epsilon_k$ from step 520. In an exemplary embodiment, the equalizer calculates the gradient only when the phase aligned slicer error $\epsilon_k$ corresponds to a phase correction symbol.

At step 514, the equalizer updates the equalizer coefficients $c_l$ through $c_i$ according to the LMS algorithm. More specifically, the equalizer updates the equalizer coefficients by combining the current set of equalizer coefficients with the product of the gradient from step 512 and the equalizer step size $\Delta$. In an exemplary embodiment, the equalizer updates the equalizer coefficients only when the phase aligned slicer error $\epsilon_k$ corresponds to a phase correction symbol.

After updating the coefficients in step 514, the equalizer stores the updated coefficients in step 506 and returns to step 502 to load the next symbol of the input signal into the register.

Figure 6:
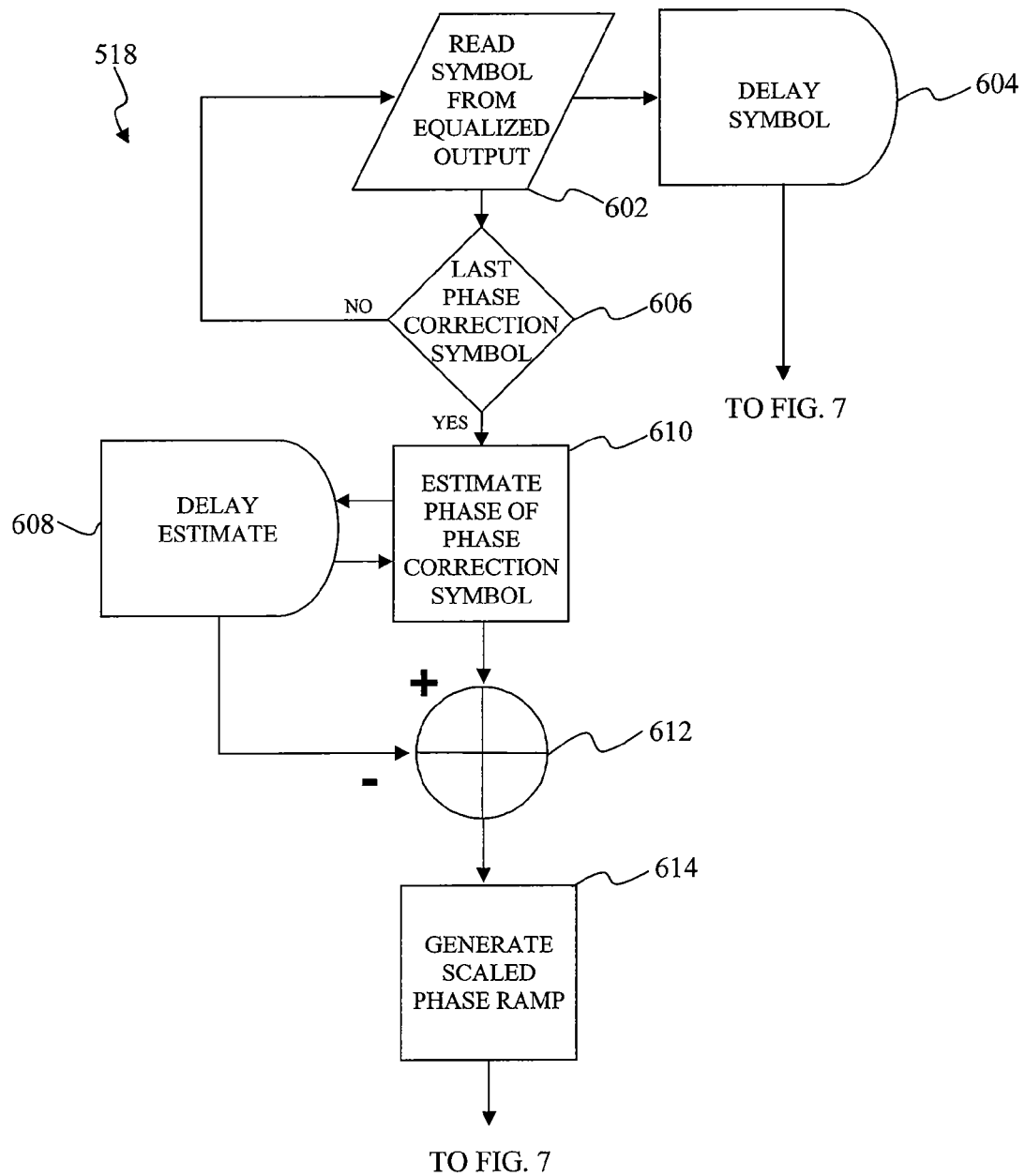
FIG. 6 is a flowchart of exemplary operational steps of a phase correction module according to an aspect of the present invention.

FIG. 6 is a flowchart of exemplary operational steps of a phase correction module according to an aspect of the present invention. In other words, FIG. 6 further defines step 518 as shown in FIG. 5. The invention is not limited to this operational description. Rather, it will be apparent to persons skilled in the relevant art(s) from the teachings herein that other operational control flows are within the scope and spirit of the present invention. The following discussion describes the steps in FIG. 6.

Referring back to FIG. 5, the phase correction module estimates the difference in the unknown phase offset between adjacent groups of phase correction symbols and generates a phase ramp that is used to correct for the unknown phase offsets during step 518.

At step 602, the equalizer reads a symbol from the symbol content of the equalized output. The equalizer uses phase correction symbols embedded within the symbol content of the equalized output to estimate the unknown phase offsets embedded in the received symbol stream.

At step 604, the equalizer buffers or delays the symbol read in step 602 until the equalizer ascertains the unknown phase offsets present in the symbol content of adjacent groups of phase correction symbols. Once the equalizer ascertains the unknown phase offsets present in the symbol content of adjacent groups of phase correction symbols, the equalizer may then compensate for the unknown phase offsets associated with the symbols located between the adjacent groups of phase correction symbols.

At step 606, the equalizer determines whether the symbol content of the equalized output read in step 602 is the last phase correction symbol in a group of phase correction symbols. To determine whether the symbol content of the equalized output is a phase correction symbol, the equalizer may use a header acquisition system, a frame synchronization process, or any other suitable means. If the symbol content of the equalized output is the last phase correction symbol in a group of phase correction symbols, the equalizer proceeds onto step 610 to estimate the unknown phase offset present within the group of phase correction symbols. Otherwise, the equalizer returns to step 602 to read the next symbol of the equalized output.

At step 610, the equalizer estimates the unknown phase offset present within the group of pilot symbols.

At step 608, the equalizer delays the phase estimate. More specifically, the equalizer buffers or delays the phase estimate generated in step 610 until the location of the next group of phase correction symbols adjacent to the current group of phase correction symbols. Upon location of the adjacent group of phase correction symbols, the equalizer enters back into 610 and generates another phase estimate.

At step 612, the equalizer calculates the difference between the current phase estimate and a previous phase estimate to determine the unknown phase offset between adjacent groups of phase correction symbols. For example, if the phase correction symbol group 406.1, as previously shown in FIG. 4, contains a phase offset of 10.0 degrees, the equalizer may generate a phase estimate corresponding to 10.0 degrees in step 610. Upon location of the adjacent phase correction symbol group, in this case 406.2, the equalizer delays or buffers the phase estimate from step 610 in step 608 and then returns to step 610. If the pilot symbol 406.2 contains an offset of 15.0 degrees, the equalizer may generate a phase estimate corresponding to 15.0 degrees in step 610. At step 612, the equalizer subtracts the delayed phase estimate from step 608 with the phase estimate of step 610 to estimate the unknown phase offset difference.

At step 614, the equalizer generates a scaled phase ramp based upon the difference of step 612. The equalizer first scales the difference from step 612. More specifically, the equalizer may divide the difference of step 612 by an amount equal to the number of symbols located between adjacent groups of phase correction symbols. For example, when the data located between adjacent groups of phase correction symbols is 1440 symbols in length, and the number of symbols in a phase correction symbol group is 36, the equalizer may divide the difference of step 612 by 1476. The equalizer next integrates the scaled phase offset over time to produce a linear phase ramp. It then converts the phase ramp into a sinusoidal complex representation, where the phase of each component sinusoidal output is a linear ramp over time. The phase ramp is a substantially linear function whose slope is dependent on the difference in phase offset between adjacent groups of phase correction symbols. If the difference between the phase offsets of the adjacent groups of phase correction symbols is negative, for example, the phase correction symbol group 406.1 has a substantially greater unknown phase offset than phase correction symbol group 406.2 as shown in FIG. 4, and the phase ramp is a substantially decreasing linear function. In this case, the phase ramp will have a maximum value when evaluating the symbol content adjacent to the phase correction symbol group 406.1. The phase ramp will have a minimum value when evaluating the symbol content adjacent to the phase correction symbol group 406.2. On the other hand, if the difference between the phase offsets of the adjacent groups of phase correction symbols is positive, for example, the phase correction symbol group 406.1 has a substantially lesser unknown phase offset than the phase correction symbols group 406.2 as shown in FIG. 4, the phase ramp is a substantially increasing linear function. In this case, phase ramp will have a minimum value when evaluating the symbol content adjacent to 406.1. The phase ramp will have a maximum value when evaluating the symbol content adjacent to 406.2.

Figure 7:
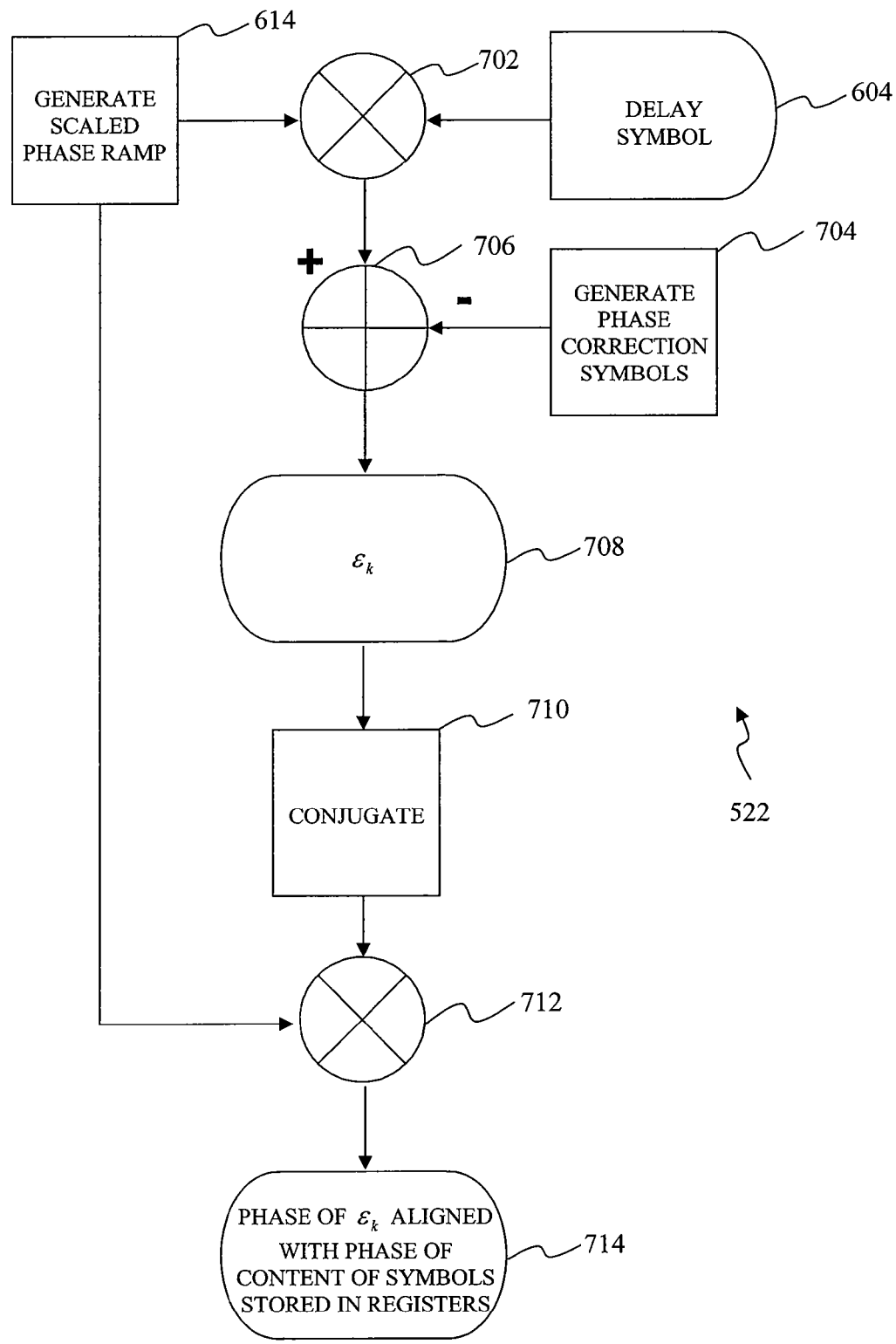
FIG. 7 is a flowchart of exemplary operational steps of a phase alignment module according to an aspect of the present invention.

FIG. 7 is a flowchart of exemplary operational steps of a phase alignment module according to an aspect of the present invention. The invention is not limited to this operational description. In other words, FIG. 7 further defines step 522 as shown in FIG. 5. Rather, it will be apparent to persons skilled in the relevant art(s) from the teachings herein that other operational control flows are within the scope and spirit of the present invention. The following discussion describes the steps in FIG. 7.

At step 702, the equalizer multiplies the delayed symbol content of the equalized output from step 604 by the DDFS output generated in step 614 to derotate the delayed symbol content of the equalized output. In other words, the unknown phase offset may rotate constellation points in the constellation diagram of the equalized output. A constellation diagram is a representation of a digital modulation scheme in the complex plane. For example, the unknown phase offset in the equalized output for a 16-quadrature amplitude modulation (QAM) communication signal may rotate the sixteen constellation points an amount related to the unknown phase offset. At step 702, the equalizer multiplies the delayed symbol content of the equalized output from step 604 by the DDFS output generated in step 614 to rotate the constellation points in the constellation diagram in the opposite direction as the unknown phase offset At step 704, the equalizer may regenerate the phase correction symbols using any suitable means.

At step 706, the equalizer generates the slicer error $\epsilon_k$, represented by step 708, by subtracting the phase correction symbols generated in step 704 from the derotated output of step 702. In an exemplary embodiment, the equalizer generates the slicer error $\epsilon_k$ when it corresponds to a pilot symbol At step 710, the equalizer conjugates the DDFS output of step 614 to produce its complex conjugate.

At step 712, the equalizer multiplies the slicer error $\epsilon_k$ of step 708 and the conjugated DDFS output of step 710 to align the phase of the slicer error $\epsilon_k$ with the corresponding delayed shift register symbols stored during step 504. In other words, the equalizer aligns the phase of the slicer error $\epsilon_k$ with the corresponding delayed shift register symbols stored during step 504 by rotating the slicer error $\epsilon_k$ by the conjugated DDFS output of step 710. Once the phase of the slicer error $\epsilon_k$ aligns with the phase of the content of the delayed shift register symbols, the equalizer 300 may update the equalizer coefficients $c_l$ through $c_i$ according to the LMS algorithm.

Figure 8:
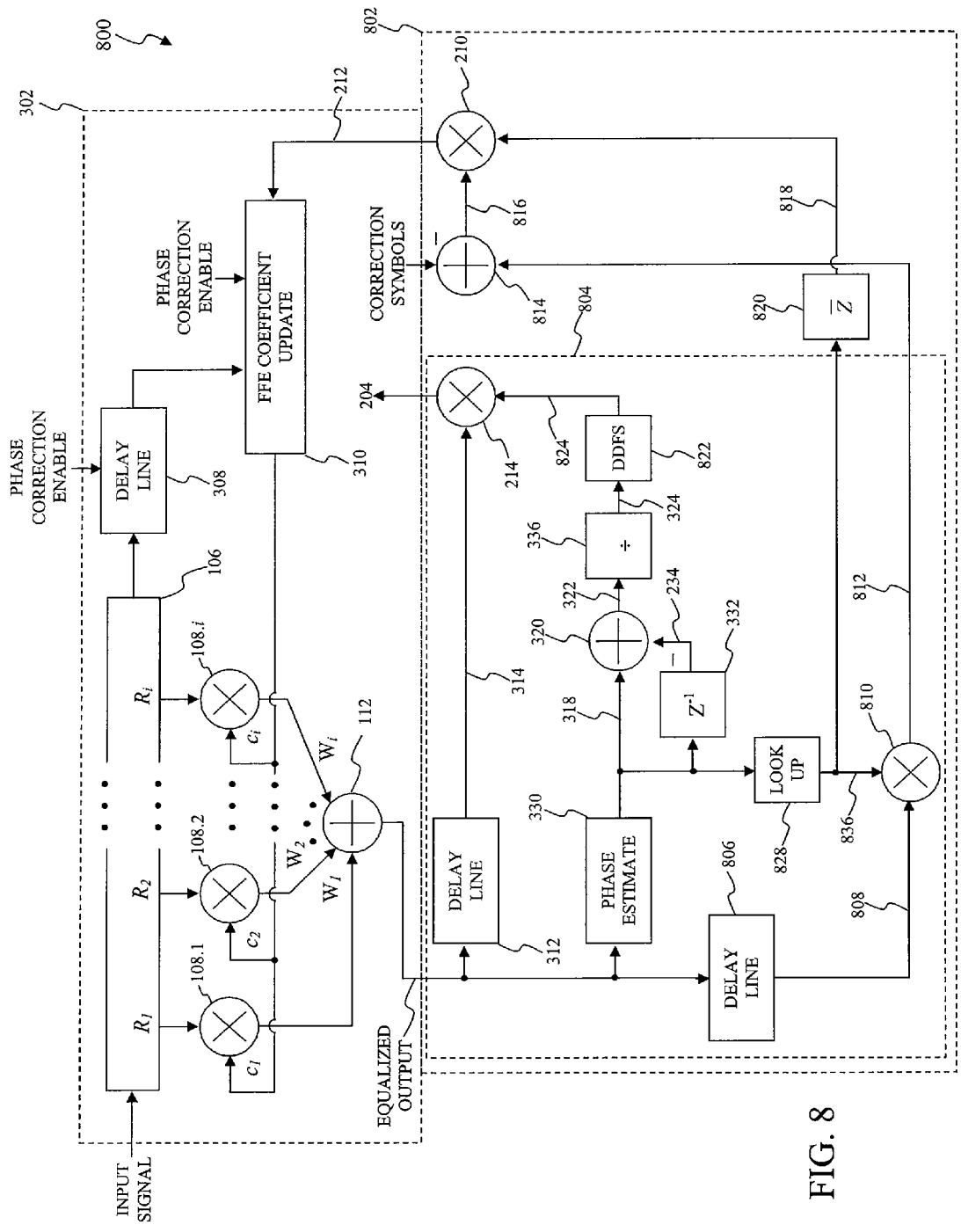
FIG. 8 is an illustration of a block diagram of an equalizer using a phase correcting circuit according to a further exemplary embodiment of the present invention.

FIG. 8 is an illustration of a block diagram of an equalizer using a phase correcting circuit according to a further exemplary embodiment of the present invention. In both high signal-to-noise ratio and lower signal-to-noise ratio conditions, an equalizer 800 may compensate for phase variation distortion caused by a communication channel. More specifically, the equalizer 800 uses a phase correcting circuit that is capable of compensating for either slow or fast changing unknown phase offsets in both high signal-to-noise ratio and lower signal-to-noise ratio conditions. The process of phase offset compensation introduces phase offsets between the slicer error $\epsilon_k$, denoted as slicer error 816 in FIG. 8, and the phase of the content of the input signal in registers $R_l$ through $R_i$. The equalizer 800 realigns the phase of the slicer error $\epsilon_k$ with the phase of the content of the input signal in registers $R_l$ through $R_i$ prior to calculating $\vec{R}_k$. As a result, the equalizer 800 may compensate for the distortion caused by the communication channel in high signal-to-noise ratio and lower signal-to-noise ratio conditions.

In an exemplary embodiment, the equalizer 800 uses a phase correction symbol embedded in the input signal, to correct for unknown phase offsets. The equalizer 800 operates in a substantially similar manner as the equalizer 300 in terms of the method by which it produces the derotated output 204. However, the equalizer 300 and equalizer 800 differ in the method by which they compensate for the unknown phase offsets in the error signal used to update the equalizer coefficients $c_l$ through $c_i$. Referring back to FIG. 3, the equalizer 300 contains a potentially long delay in the feedback path to the coefficient update module 310. Delay line 312 delays the symbol content of the equalized output until the phase alignment module 304 estimates the unknown phase offsets present in the symbol content of adjacent groups of phase correction symbols. A linear phase ramp is generated between the adjacent phase estimates to correct for the unknown phase offsets in the equalized output. The delay in the feedback path to the coefficient update module 310 may substantially limit the ability of equalizer 300 to track fast changing dynamic distortion.

By contrast, the equalizer 800 contains a path to the coefficient update module 310 that is traversed only by group of phase correction symbols. The phase estimate generated by a group of phase correction symbols corrects for the unknown phase offset in that same group. The corrected phase correction symbols are then used to update the equalizer coefficients $c_1$ through $c_i$. By using the current phase estimate rather than a linear phase ramp, the delay in the feedback path to the coefficient update module 310 is substantially reduced when compared to equalizer 300, thereby enhancing the equalizer's ability to track rapidly changing distortion. The constant phase correction is less accurate than the linear phase correction, but the inaccuracy is small over the duration of a set of phase correction symbols.

The equalizer 800 includes a FFE 302 and a phase alignment module 802. The FFE 302 operates in a substantially similar manner as the FFE 302 as previously demonstrated in FIG. 3. In high signal-to-noise ratio and lower signal-to-noise ratio conditions, the phase alignment module 802 aligns the phase of slicer error $\epsilon_k$ with the phase of the content of the input signal in registers $R_1$ through $R_i$. The phase alignment module 802 includes a phase correction module 804, a summer 814, a conjugate module 820, and a multiplier 210. The phase correction module 804 is the mechanism by which the equalizer 800 substantially corrects for the unknown phase offsets in the symbol content of the equalized output. The phase correction module 804 includes a delay line 312, a multiplier 214, a phase estimate module 330, a delay module 332, a summer 320, a scalar 336, a Direct Digital Frequency Synthesizer (DDFS) 822, a delay line 806, a sine/cosine look up table 826, and a multiplier 810.

The equalized output is embedded with phase correction symbols as shown in FIG. 4. The symbol content of the equalized output contains substantially similar unknown phase offsets compared to the symbol content of the input signal.

The delay line 312 produces a delayed equalized output 314 by delaying the symbol content of the equalized output until the phase correction module 804 estimates the unknown phase offsets present in the symbol content of adjacent groups of phase correction symbols. The delayed equalized output 314 is embedded with substantially similar symbols as the equalized output. In an exemplary embodiment, the delay line 312 delays the symbol content of the equalized output by the number of symbols located between adjacent groups of phase correction symbols. For example, if the data located between adjacent groups of phase correction symbols is 1440 symbols in length, and the groups of phase correction symbols are 36 symbols in length, then the delay line 312 may delay the equalized output by 1476 symbols.

The phase estimate block 330 generates an estimate of the unknown phase offset present in the equalizer output for a group of phase correction symbols. The phase correction module 804 may use multiple estimates to correct the symbol content of the equalized output for the unknown phase offsets. In an exemplary embodiment, a delay module 332 delays the phase estimate 318 to produce a delayed phase estimate 334. More specifically, the delay module 332 delays the phase estimate 318 until the phase correction module 804 locates an adjacent group of phase correction symbols. After location of the adjacent group of phase correction symbols, the delayed phase estimate 334 and the current phase estimate 318 may be combined to correct the symbol content of the equalized output for the unknown phase offsets. To determine whether the symbol content of the equalized output is a phase correction symbol, the equalizer 800 may use a header acquisition system, a frame synchronization process, or any other suitable means. Summer 320 generates an offset estimation 322 using the difference between the current phase estimate 318 and the delayed phase estimate 334. For example, as previously shown in FIG. 4, if the group of phase correction symbols denoted 406.1, contains a phase offset of 10.0 degrees, the phase estimate module 330 may generate a phase estimate 318 corresponding to 10.0 degrees. Upon location of the adjacent group of phase correction symbols, in this case denoted 406.2, the delay module 332 generates the delayed phase estimate 334. Delayed phase estimate 334 is a delayed version of the phase estimate 318. If the group of phase correction symbols 406.2 contains an offset of 15.0 degrees, phase estimate module 330 may generate a phase estimate 318 that corresponds to 15.0 degrees. Summer 320 then generates an offset estimation 322 corresponding to 5.0 degrees by subtracting the phase estimate 318 from the delayed phase estimate 334. A scalar 336 scales the offset estimate 332 to produce a scaled estimation 324. More specifically, the scalar 336 divides the offset estimate 332 by an amount equal to the number of symbols located between the adjacent groups of phase correction symbols. For example, the scalar 336 may divide the offset estimate 322 by 1476. A DDFS 822 integrates the scaled estimation 324 over time to produce a linear phase ramp then converts the phase ramp into a sinusoidal complex representation, where the phase of each component sinusoidal output is a linear ramp over time. The phase correction module 804 uses a DDFS output 824 to compensate for the unknown phase offsets present in the equalized output.

The phase ramp that underlies DDFS output 824 is a substantially linear function whose slope is dependent on the difference in the unknown phase offsets of the adjacent groups of phase correction symbols. If the difference between the unknown phase offsets of the adjacent groups of phase correction symbols is negative, for example, the phase correction symbol group 406.1 has a substantially greater unknown phase offset than the phase correction symbol group 406.2 as shown in FIG. 4, the phase ramp that underlies DDFS output 824 is a substantially decreasing linear function. In this case, the phase ramp that underlies DDFS output 824 will have a maximum value when evaluating the symbol content adjacent to the phase correction symbol group 406.1. The phase ramp that underlies DDFS output 824 will have a minimum value when evaluating the symbol content adjacent to phase correction symbol group 406.2. On the other hand, if the difference between the unknown phase offsets of the adjacent groups of phase correction symbols is positive, for example, when the phase correction symbol group 406.1 has a substantially lesser unknown phase offset than the phase correction symbol 406.2 group as shown in FIG. 4, the phase ramp that underlies DDFS output 824 is a substantially increasing linear function. In this case, phase ramp that underlies DDFS output 824 will have a minimum value when evaluating the symbol content adjacent to 406.1. The phase ramp that underlies DDFS output 824 will have a maximum value when evaluating the symbol content adjacent to 406.2.

Multiplier 214 multiplies each individual symbol of the delay line output 314, which is embedded with substantially similar symbols as the equalized output, with a corresponding value from the DDFS output 824 to produce a derotated output 204. The unknown phase offset may rotate constellation points in the constellation diagram of the equalized output. A constellation diagram is a representation of a digital modulation scheme in the complex plane. For example, the unknown phase offset in the equalized output for a 16-quadrature amplitude modulation (QAM) communication signal may rotate the sixteen constellation points an amount related to the unknown phase offset. Multiplier 214 multiplies the symbol content of the delayed equalizer output by a corresponding value from the DDFS output 824 to rotate the constellation points in the constellation diagram in the opposite direction as the unknown phase offset.

The delay line 806 produces a delayed equalized output 808 that corresponds only to phase correction symbols. The equalized output symbols that correspond to a group of phase correction symbols are delayed until the phase estimate 330 generates the estimate of the unknown phase offsets present in the symbol content of that group of phase correction symbols. In an exemplary embodiment, the delay line 806 delays phase correction symbols by the duration of the phase correction symbols. For example, if the phase correction symbols are 36 symbols in length, then the delay line 806 may delay the equalized output by 36 symbols. This delay is generally far shorter than the delay in delay line 312.

A sine/cosine look up table 828 translates the output of the phase estimate block 330 to a sinusoidal complex representation, where the phase of each component sinusoidal output is equal to the phase estimate. A multiplier 810 multiplies the symbol content of the delayed equalized output 808 with the sinusoidal output 836 produce a derotated output 812. The multiplier 810 multiplies the symbol content of the delayed equalized output 808 by the sinusoidal output 836 to rotate the constellation points in the constellation diagram in the opposite direction as the unknown phase offset.

A slicer error 816 is substantially relative to the slicer error $\epsilon_k$ as presented in equation 1. In an exemplary embodiment, the equalizer coefficients are updated when the slicer error $\epsilon_k$ corresponds to a phase correction symbol. A summer 814 forms the slicer error 816 by subtracting the known phase correction symbols from the derotated output 812 when the derotated output 812 corresponds to a phase correction symbols. Equalizer 800 may regenerate the phase correction symbols using any suitable means.

The phase alignment module 802 aligns the phase of the slicer error 816 with the content of the input signal in registers $R_l$ through $R_i$ to allow for the proper updating of the equalizer coefficients $c_l$ through $c_i$ according to the LMS algorithm. Conjugate module 820 conjugates the output of the look up table 828 to produce a conjugated signal 818 whose elements are complex conjugates of the output of look up table 828. Multiplier 210 multiplies the slicer error 816 and the conjugated signal 818 to produce the phase corrected signal 212. In other words, multiplier 210 generates the phase corrected signal 212 by rotating the slicer error 816 by the complex conjugate of the signal 836 used to rotate the delayed equalized output 808. The signal 212 is a slicer error $\epsilon_k$ that is time and phase aligned with the content of the input signal in registers $R_l$ through $R_i$ allowing equalizer 800 to update the equalizer coefficients $c_l$ through $c_i$ according to the LMS algorithm.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An equalization circuit for correcting unknown phase offsets of a received data stream having a subset of phase correction symbols, wherein a phase of the subset of phase correction symbols is offset from a phase of a transmitted data stream by an unknown amount, comprising:
a feed forward equalizer (FFE) data register including multiple stages, wherein an output of each stage of the FFE data register is multiplied by a respective equalizer coefficient to produce weighted outputs of the FFE data register;
a first adder, wherein the first adder is configured to sum the weighted outputs of the FFE data register to produce an equalized output;
a coefficient update module coupled to the FFE data register, wherein the coefficient update module is configured to receive the phase correction symbols as an input and to update the equalizer coefficients based on the phase correction symbols;
a phase alignment module coupled to the coefficient update module and the first adder, wherein the phase alignment module is configured to estimate the unknown phase offsets in the phase correction symbols and to adjust the phase correction symbols based upon the estimate of the unknown phase offsets; and
a delay line coupled to the FFE data register and the coefficient update module.

2. The equalizer of claim 1, wherein the equalized output includes a phase, wherein the phase alignment module substantially adjust the phase of the equalized output using a phase estimate based on the subset of phase correction symbols.

3. The equalizer of claim 1, wherein the phase alignment module further comprises:
a phase correction module configured to receive the equalized output, wherein the phase correction module is configured to estimate the unknown phase offset in the subset of phase correction symbols.

4. The equalizer of claim 1, wherein the phase alignment module is configured to estimate the unknown phase offset by comparing a phase of the subset of phase correction symbols with a phase of an adjacent subset of phase correction symbols.

5. The equalizer of claim 3, wherein the phase alignment module further comprises:
a second adder configured to combine an output of the phase correction module and the subset of phase correction symbols;
a conjugate module configured to conjugate a second output of the phase correction module; and
a multiplier configured to multiply an output of the second adder with an output of the conjugate module.

6. The equalizer of claim 3, wherein the phase correction module further comprises:
a phase estimate module configured to receive the equalized output, wherein the phase estimate module produces an estimate of a phase of the phase correction symbols;
a delay module configured to delay the estimate of a phase of the phase correction symbols;
a second adder configured to combine the estimate of a phase of the phase correction symbols with an output of the delay module; and a scalar module configured to scale an output of the second adder by a scaling factor, wherein the scaling factor is dependent upon a duration of data stream symbols between adjacent subsets of phase correction symbols.

7. The equalizer of claim 6, wherein the phase correction module further comprises:
a second delay line configured to receive the equalized output, wherein the second delay line delays the equalized output by the duration of data stream symbols between adjacent subsets of phase correction symbols;
a Direct Digital Frequency Synthesizer (DDFS) configured to integrate an output of the scalar module to produce a linear phase ramp; and
a second multiplier configured to multiply the linear phase ramp by an output of the second delay line.

8. The equalizer of claim 7, wherein the phase correction module further comprises:
a third delay line configured to receive the equalized output, wherein the third delay line is configured to delay the equalized output by a duration of the subsets of phase correction symbols;
a sine/cosine look up table configured to convert the estimate of a phase of the phase correction symbols to a complex number; and
a third multiplier configured to multiply an output of the sine/cosine look up table by an output of the third delay line.

9. The equalizer of claim 1, wherein the equalizer coefficients are updated according to the Least Mean Squares (LMS) algorithm.

10. The equalizer of claim 1, wherein the subset of phase correction symbols includes known pilot symbols.

11. A method to update equalizer coefficients comprising:
storing symbols from a demodulated data stream into a serial shift register, wherein a phase of the demodulated data stream is offset from a phase of a transmitted modulated data stream by an unknown amount;
delaying the symbols stored in the serial shift register;
equalizing the demodulated data stream by creating a weighted sum of the symbols stored in the serial shift register to form an equalized output, wherein the equalized output is offset from a phase of a transmitted modulated data stream by an unknown amount;
estimating the unknown phase offset of the equalized output;
adjusting the phase of the equalized output relative to the estimate of the unknown phase offset of the equalized output;
generating an error value based on the equalized output;
aligning the phase and timing of the error value relative to the symbols stored in the serial shift register; and
updating the equalizer coefficients using the aligned error value and the symbols stored in the serial shift register.

12. The method of claim 11, wherein the step of estimating the unknown phase offset of the equalized output further comprises:
estimating a phase of a group of phase correction symbols embedded within the demodulated data stream; and
generating a complex representation of the estimate of the phase of the group of phase correction symbols.

13. The method of claim 12, wherein the step of adjusting the phase of the equalized output relative to the estimate of the unknown phase offset of the equalized output further comprises:
subtracting a phase estimate of a previous group of phase correction symbols from a phase estimate of a current group of phase correction symbols.

14. The method of claim 12, wherein the step of adjusting the phase of the equalized output further comprises:
delaying the equalized output; and
multiplying the complex representation of the phase estimate of the group of phase correction symbols and a previously stored equalized output stream.

15. The method of claim 12, wherein the step of generating a complex representation of the phase of the phase correction symbol further comprises:
scaling the estimate of the phase of the group of phase correction symbols.

16. The method of claim 12, wherein the step of aligning phase and timing of the error value relative to the symbols stored in the serial shift register further comprises:
rotating an error value by a complex conjugate of the estimate of the phase of the group of phase correction symbols.

17. The method of claim 11, wherein the step of updating the equalizer coefficients further comprises:
updating the equalizer coefficients when the error value correspond to the phase correction symbols.

* * * * *

UNITED STATES PATENT AND TRADEMARK OFFICE
CERTIFICATE OF CORRECTION

| | | |
|---|---|---|
| PATENT NO. | : 7,715,472 B2 | Page 1 of 1 |
| APPLICATION NO. | : 11/583713 | |
| DATED | : May 11, 2010 | |
| INVENTOR(S) | : Yu et al. | |

It is certified that error appears in the above-identified patent and that said Letters Patent is hereby corrected as shown below:

At column 18, lines 32-33, please replace "module substantially" with --module is configured to substantially--.

Signed and Sealed this

Twenty-eighth Day of September, 2010

David J. Kappos
*Director of the United States Patent and Trademark Office*